US012573331B2

(12) United States Patent
Noh et al.

(10) Patent No.: US 12,573,331 B2
(45) Date of Patent: Mar. 10, 2026

(54) DISPLAY DEVICE AND DRIVING METHOD THEREOF

(71) Applicant: LG Display Co., Ltd., Seoul (KR)

(72) Inventors: Suncheol Noh, Paju-si (KR); Taegung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/982,915

(22) Filed: Dec. 16, 2024

(65) Prior Publication Data

US 2025/0273124 A1 Aug. 28, 2025

(30) Foreign Application Priority Data

Feb. 26, 2024 (KR) ........................ 10-2024-0027084

(51) Int. Cl.
*G09G 3/20* (2006.01)

(52) U.S. Cl.
CPC ..... *G09G 3/2096* (2013.01); *G09G 2330/021* (2013.01); *G09G 2330/027* (2013.01); *G09G 2340/0435* (2013.01)

(58) Field of Classification Search
CPC ............... G09G 3/2092; G09G 3/2096; G09G 2330/021; G09G 2330/027; G09G 2340/0435
See application file for complete search history.

(56) References Cited

U.S. PATENT DOCUMENTS 6,741,240 B1 * 5/2004 Akaiwa ................ H04N 9/3182 345/204
7,209,135 B2 * 4/2007 Akaiwa .................. G09G 5/006 345/530
7,605,794 B2 * 10/2009 Nurmi .................. G09G 3/3611 345/207
10,965,867 B2 * 3/2021 Yamamoto ........... H04N 23/951
11,893,929 B2 * 2/2024 Yang .................... G09G 3/2092
2004/0183793 A1 * 9/2004 Akaiwa .................. H04N 9/641 345/698
2010/0225625 A1 * 9/2010 Morita ................ G09G 3/3688 345/205

FOREIGN PATENT DOCUMENTS

KR 10-2014-0005414 A 1/2014

* cited by examiner

*Primary Examiner* — Gene W Lee
(74) *Attorney, Agent, or Firm* — Birch, Stewart, Kolasch & Birch, LLP

(57) ABSTRACT

A display device includes a host system configured to output an image signal and a control signal including information on a frame frequency, a timing controller configured to generate image data based on the image signal, generate a timing control signal in correspondence with the information on a frame frequency based on the control signal, and output the image data and the timing control signal, a memory part including a non-volatile memory and a volatile memory, and a micro-controller unit configured to control the memory part. The micro-controller unit can save information on a frame frequency of a current frame frequency in the non-volatile memory when a power-off signal is generated. The timing controller can set a frame frequency based on the information on the frame frequency saved in the non-volatile memory when a power-on signal is generated.

12 Claims, 5 Drawing Sheets

2 Host system
10 Timing controller
20 Gate driver
30 Data driver
40 Power supply

DISPLAY DEVICE AND DRIVING METHOD THEREOF

CROSS-REFERENCE TO RELATED APPLICATION

The present application claims priority to Korean Patent Application No. 10-2024-0027084, filed in the Republic of Korea on Feb. 26, 2024, the entire contents of which is hereby expressly incorporated by reference into the present application.

BACKGROUND

Field

The present disclosure relates to a display device, and a method for driving the same.

Discussion of the Related Art

As information society has developed, various demands on display devices for displaying images are increasing, and various display devices such as a liquid crystal display (LCD), and an organic light emitting display (OLED) have been utilized.

The images displayed in the display device can be still images or moving images. If the images are moving images, the images can be various kinds such as sports images, game images, movies, and the like.

The display device can reduce power consumption and extend its lifespan when the display device is driven in a variable refresh rate (VRR) mode that varies the driving frequency depending on the type of images.

SUMMARY OF THE DISCLOSURE

The various embodiments of the present disclosure provide a display device capable of saving information on a frame frequency which is set before power-off and setting a frame frequency based on the information on the frame frequency saved at a time of power-on, when the display device is driven in a variable refresh rate mode, and further provide a method for driving the display device.

One embodiment of the present disclosure is a display device, including: a host system configured to output an image signal and a control signal including information on a frame frequency; a timing controller configured to generate image data based on the image signal and generate a timing control signal in correspondence with the information on a frame frequency based on the control signal and output the image data and the timing control signal; a memory part including a non-volatile memory and a volatile memory; and a micro-controller unit configured to control the memory part.

According to aspects of the present disclosure, the micro-controller unit can be configured to save information on a frame frequency of a current frame frequency in the non-volatile memory when a power-off signal is generated, and the timing controller can be configured to set a frame frequency based on the information on the frame frequency saved in the non-volatile memory when a power-on signal is generated.

According to aspects of the present disclosure, when the frame frequency is varied by the host system during display driving, the micro-controller unit can save information on the varied frame frequency in the volatile memory.

According to aspects of the present disclosure, when the power-off signal is generated, the micro-controller unit can save, in the non-volatile memory, the information on the frame frequency last saved in the volatile memory.

According to aspects of the present disclosure, when the power-on signal is generated, the micro-controller unit and the timing controller can perform a power-on process including firmware booting that loads predetermined firmware, logic booting that loads a saved control parameter, and panel booting that applies a driving power to a display panel.

According to aspects of the present disclosure, during the logic booting, the micro-controller unit and the timing controller can load the information on the varied frame frequency saved in the volatile memory, and set the frame frequency based on the loaded information on the frame frequency.

According to aspects of the present disclosure, the display device can further include: a display panel on which pixels are disposed; and a data driver connected to the timing controller through a first interface line and configured to provide a data voltage in correspondence with the image data to the pixels based on the timing control signal.

According to aspects of the present disclosure, the timing controller can vary a quantity of the first interface line through which data is transmitted to the data driver based on the information on the frame frequency.

According to aspects of the present disclosure, the timing controller can increase the quantity of the first interface line when the frame frequency increases, and decrease the quantity of the first interface line when the frame frequency decreases.

According to aspects of the present disclosure, the timing controller can be connected to the micro-controller unit through a second interface line, and vary a quantity of the second interface line through which data is transmitted to the micro-controller unit based on the information on the frame frequency.

Another embodiment of the present disclosure is a method for driving a display device which drives a display device including: a timing controller configured to generate image data and a timing control signal in correspondence with information on a frame frequency and output the image data and the timing control signal; a memory part comprising a non-volatile memory and a volatile memory; and a micro-controller unit configured to control the memory part.

According to aspects of the present disclosure, the method can include: saving information on a frame frequency of a current frame frequency in the non-volatile memory when a power-off signal is generated; allowing the timing controller to perform a power-off process to turn off power in response to the power-off signal; and allowing the micro-controller unit and the timing controller to perform a power-on process when a power-on signal is generated.

According to aspects of the present disclosure, the performing of the power-on process can include loading the information on the frame frequency saved in the non-volatile memory; and allowing the timing controller to set a frame frequency based on the loaded information on the frame frequency.

According to aspects of the present disclosure, the method for driving the display device can further include when the frame frequency is varied by the host system during display driving before the power-off signal is generated, allowing the micro-controller unit to save information on the varied frame frequency in the volatile memory.

According to aspects of the present disclosure, the saving of the information on the frame frequency in the non-volatile memory can include saving, in the non-volatile memory, the information on the frame frequency last saved in the volatile memory during display driving, when the power-off signal is generated.

According to aspects of the present disclosure, the performing of the power-off process can include: firmware booting that loads a predetermined firmware; logic booting that loads a saved control parameter; and panel booting that applies a driving power to a display panel, and during the logic booting, the loading the information on the frame frequency and the setting a frame frequency can be simultaneously performed.

According to aspects of the present disclosure, the display device can further include: a display panel on which pixels are disposed; and a data driver connected to the timing controller through a first interface line and configured to provide a data voltage in correspondence with the image data to the pixels based on the timing control signal.

According to aspects of the present disclosure, the setting of the frame frequency can include varying a quantity of the first interface line through which data is transmitted to the data driver based on the information on the frame frequency.

According to aspects of the present disclosure, the timing controller can be connected to the micro-controller unit through a second interface line, and the setting of the frame frequency can include: varying a quantity of the second interface line through which data is transmitted to the micro-controller unit based on the information on the frame frequency.

According to aspects of the present disclosure, the display device and the method for driving the same reduce time taken in setting an additional frame frequency when the display device is powered on, thereby allowing a fast start of the display driving.

BRIEF DESCRIPTION OF THE DRAWINGS

The present disclosure will become more fully understood from the detailed description given hereinbelow and the accompanying drawings which are given by way of illustration only, and thus are not limitative of the present disclosure.

DETAILED DESCRIPTION OF THE EMBODIMENTS

Figure 1:
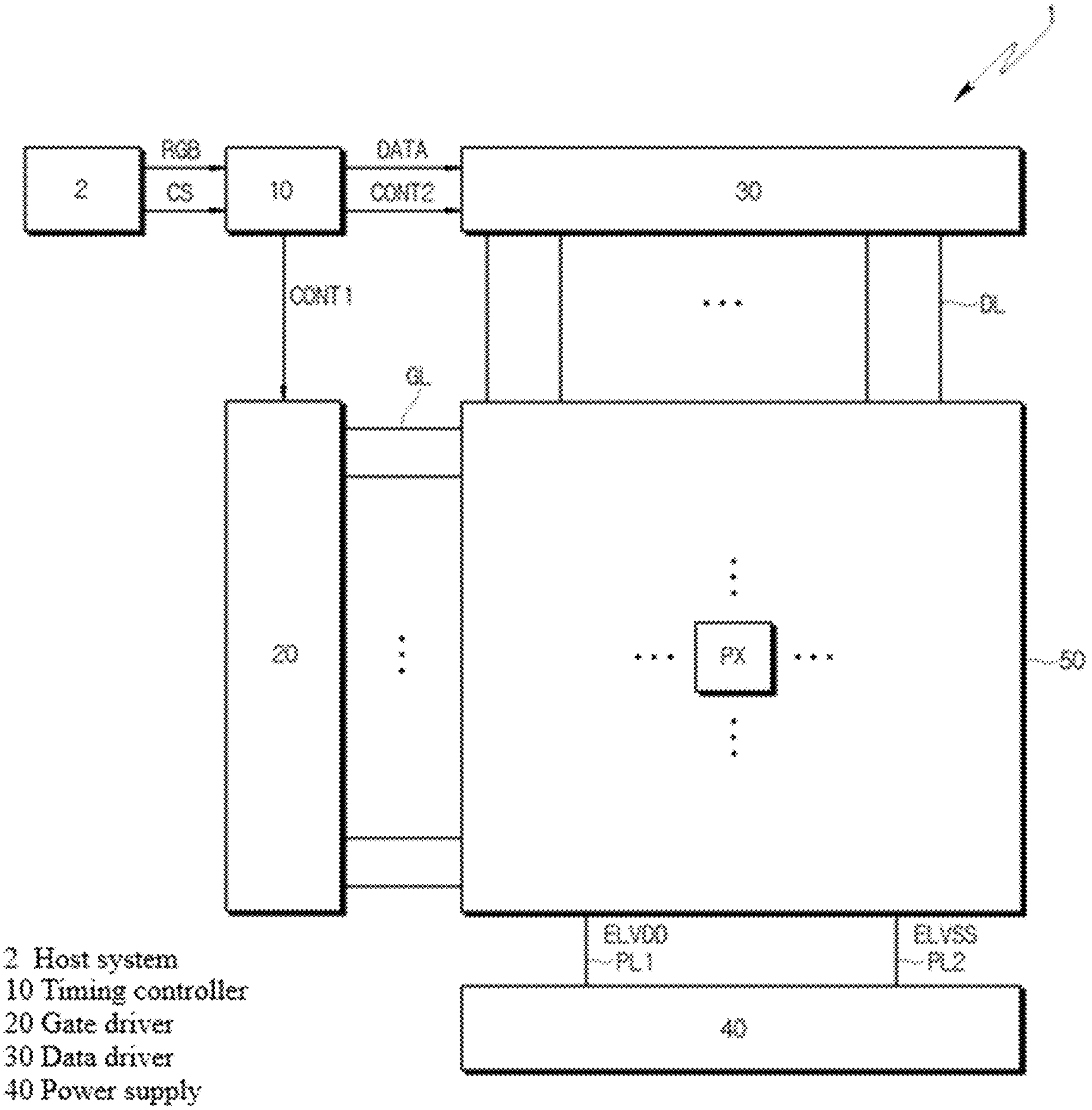
FIG. 1 is a block diagram schematically illustrating a structure of a display device according to an embodiment of the present disclosure.

Hereinafter, embodiments of the disclosure will be described with reference to the drawings. In this disclosure, when it is mentioned that a component (or, an area, a layer, a part, etc.) is referred to as being "on", "connected to" or "combined to" another component, this means that the component can be directly on, connected to, or combined to the other component or a third component therebetween can be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used only to distinguish one component from another, and may not define order or sequence. For example, a first component can be referred to as a second component and vice versa without departing from the scope of the disclosure. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

In various embodiments of the disclosure, the term "include," "comprise," "including," or "comprising," specifies a property, a fixed number, a step, a process, an element and/or a component, or a combination thereof, but does not exclude presence or addition of other properties, fixed numbers, steps, processes, elements and/or components, or a combination thereof.

Further, the term "can" fully encompasses all the meanings and coverages of the term "may." In addition, all the components of each display device according to all embodiments of the present disclosure are operatively coupled and configured.

FIG. 1 is a block diagram schematically illustrating a structure of a display device according to an embodiment of the present disclosure.

Referring to FIG. 1, a display device 1 includes a timing controller 10, a gate driver 20, a data driver 30, a power supply 40, and a display panel 50.

The timing controller 10 can receive an image signal RGB and a control signal CS from an external host system 2. The image signal RGB can include a plurality of grayscale data. For example, the control signal CS can include a vertical synchronization signal, a horizontal synchronization signal, a data enable signal and the like.

By the vertical synchronization signal and the data enable signal, one frame of the display device 1 can be defined, and an active period and a vertical blank period in the one frame can be defined. In detail, one frame can be defined as a pulse interval (for example, a pulse cycle) between nearby vertical synchronization signals. The active period is a display driving period in which an image is displayed, and can be defined as a period (for example, a pulse period) in which the data enable signal is transitioned between a logic high level and a logic low level in the one frame. A vertical blank period can be a period in which the data enable signal is maintained at a logic low level in the one frame, for example, a non-transition period.

In addition, by the data enable signal, one horizontal period in the one frame can be defined. In detail, in a pulse period of the data enable signal, the one horizontal period can be defined as a pulse interval (for example, a pulse cycle) between nearby data enable signals. The one horizontal period can include a logic high period in which the image data DATA is applied from the timing controller 10 to the data driver 30, and a logic low period in which the image data DATA is not applied from the timing controller 10 to the data driver 30, that is a horizontal blank period.

In an embodiment of the present disclosure, a length of the vertical blank period can be varied by the vertical synchronization signal and the data enable signal. The host system 2 can operate in a variable refresh rate mode in which a frame frequency (for example, a refresh rate) is varied while in the operation, by varying a length of the vertical blank period based on complexity of an input image signal RGB, and a change amount between frames of the image signal RGB etc. The host system 2 can lower the refresh rate by extending a length of the vertical blank period belonging to each frame, when the image signal RGB is complex and a change amount between frames is great. When a length of the vertical blank period in the one frame is changed, a temporal length of the one frame and the refresh rate can be varied.

The driving of the display device 1 at a refresh rate lower than a reference refresh rate can be referred to as low-frequency driving or low-speed driving, and the driving of the display device 1 at a refresh rate higher than the reference refresh rate can be referred to as high-frequency driving or high-speed driving. The refresh rate can be determined according to kinds of displayed images and the like, without limitation thereto.

The gate driver 20 can generate gate signals based on a gate timing control signal CONT1 output from the timing controller 10. The gate driver 20 can provide the generated gate signals to the pixels PX through a plurality of gate lines GL. In an embodiment of the present disclosure, one or each pixel PX can be configured to receive a plurality of gate signals each having a different wavelength. In this embodiment of the present disclosure, the gate driver 20 can provide the plurality of gate signals to the pixels PX through the gate lines GL corresponding to each of the gate signals.

The gate driver 20 can be configured in a gate-in-panel form in which the gate driver 20 is mounted on the display panel 50. The gate driver 20 can be disposed on one side of the display panel 50, or as illustrated, can be disposed on both sides, for example, on the right or on the left, of the display panel 50. According to a driving method, a panel design method and the like, the gate driver 20 can be disposed on both sides, for example, on the right and on the left, of the display panel 50, or disposed on two or more side surfaces of four side surfaces of the display panel 50.

The data driver 30 can generate data voltages based on a data timing control signal CONT2 and the image data DATA output from the timing controller 10. The data driver 30 can provide the generated data voltages to the pixels PX through a plurality of data lines DL.

The power supply 40 can generate a high potential driving voltage ELVDD and a low potential driving voltage ELVSS which are to be supplied to the display panel 50. The power supply 40 can provide the generated driving voltages ELVDD and ELVSS to the pixels PX through voltage lines PL1 and PL2 corresponding to each of the voltages.

The plurality of pixels PX, or referred to as subpixels, are disposed in the display panel 50. The pixels PX may, for example, be disposed in a matrix form in the display panel 50. The pixels PX disposed in one pixel row are connected to the same gate line GL, and the pixels PX disposed in one pixel column can be connected to the same data line DL. The pixels PX can emit light at brightness corresponding to the data voltage supplied through the data lines DL, in response to the gate signal applied through the gate lines GL.

In an embodiment of the present disclosure, each of the pixels PX can display any one color among red, green and blue. In another embodiment of the present disclosure, each of the pixels PX can display any one color among cyan, magenta, and yellow. In various embodiments of the present disclosure, each of the pixels PX can display any one color among red, green, blue, and white.

Each of the timing controller 10, the gate driver 20, the data driver 30, and the power supply 40 can be configured as a separate integrated circuit (IC), or can be configured as an integrated circuit in which at least some of them are integrated. In an embodiment of the present disclosure, the timing controller 10 can be configured as an application specific integrated circuit (hereinafter, ASIC).

Figure 2:
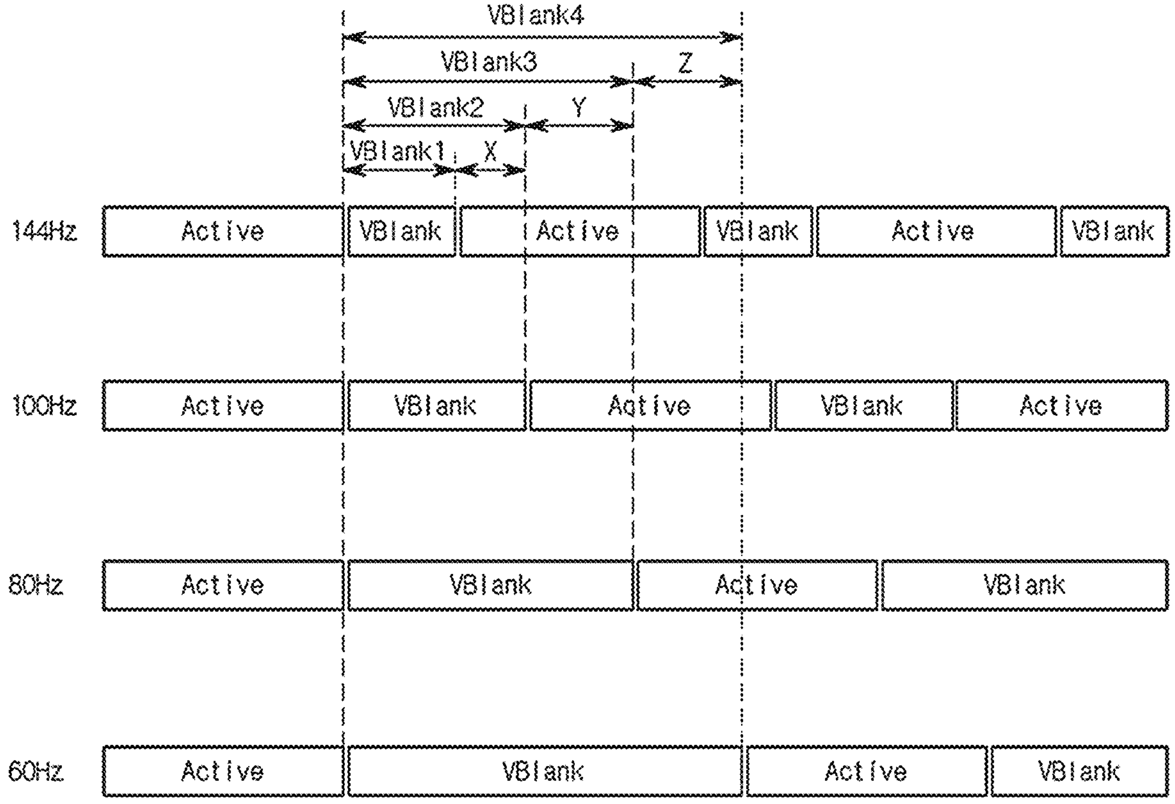
FIG. 2 is a view illustrating a method for driving a display device according to an embodiment of the present disclosure.

FIG. 2 is a view illustrating a method for driving the display device according to an embodiment of the present disclosure.

Referring to FIG. 2, in the variable refresh rate mode, one frame can consist of (or include) an active period Active and a vertical blank period VBlank. During the active period Active, each of the pixels PX can be programmed with a new data voltage, and a light emitting element of the pixel PX can emit light corresponding to the programmed data voltage. During the vertical blank period VBlank, each of the pixels PX can emit light corresponding to the data voltage, which is programmed during the active period Active. In an embodiment of the present disclosure, during the vertical blank period VBlank, a feature value of the pixel PX is sensed, and according to the sensing result, a data voltage can be compensated.

In this embodiment, the host system 2 can vary the frame frequency by changing a length of the vertical blank Vblank period, for example, a length of the non-transition period of the data enable signal, considering a rendering time of the image signal RGB. In detail, the length of the vertical blank VBlank period can be prolonged more as the refresh rate is low, and the length of the vertical blank VBlank period can be shortened more as the refresh rate is high.

For example, the host system 2 can set a length of the vertical blank period as a VBlank1 when operating a 144 Hz mode, and can adjust the length of the non-transition period of the data enable signal so that the length of the non-transition period of the data enable signal corresponds to the VBlank1. The host system 2 can set a length of the vertical blank period as a VBlank2 which is increased by as much as X compared to a length of the VBlank1 when operating a 100 Hz mode, and can adjust the length of the non-transition period of the data enable signal so that the length of the non-transition period of the data enable signal corresponds to the VBlank2. The host system 2 can set a length of the vertical blank period as a VBlank3 which is increased by as much as Y compared to a length of the VBlank1 when operating a 80 Hz mode, and can adjust the length of the non-transition period of the data enable signal so that the length of the non-transition period of the data enable signal corresponds to the VBlank3. The host system 2 can set a length of the vertical blank period as a VBlank4 which is increased by as much as Z compared to a length of the VBlank1 when operating a 60 Hz mode, and can adjust the length of the non-transition period of the data enable signal so that the length of the non-transition period of the data enable signal corresponds to the VBlank4.

Figure 3:
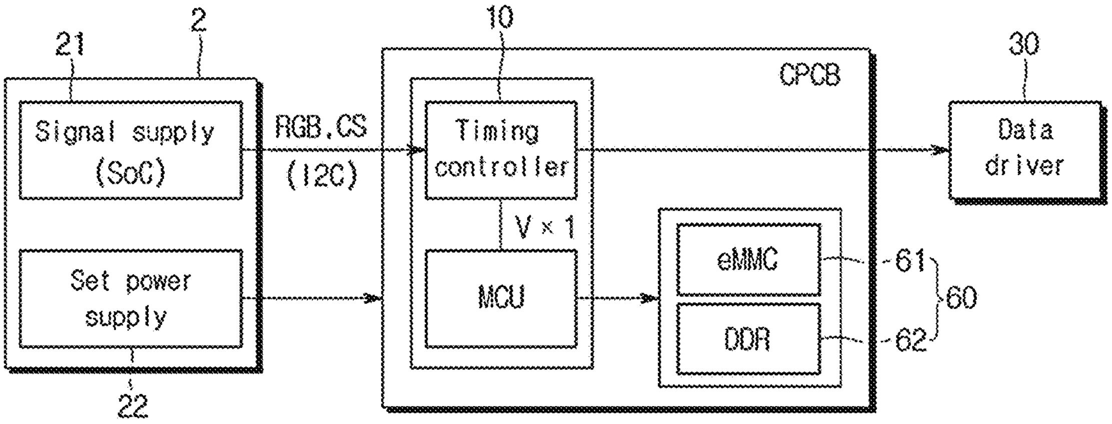
FIG. 3 is a view illustrating a connection relationship between an application specific integrated circuit (ASIC) and a set part according to an embodiment of the present disclosure.

FIG. 3 is a view illustrating a connection relationship between the ASIC and a set part according to an embodiment of the present disclosure.

Referring to FIG. 3, the display device 1 according to an embodiment of the present disclosure can include the host system 2, and a control part (printed circuit board, CPCB) including the timing controller 120 and a memory part 60, etc. embedded thereto.

The host system 2 can include a signal supply 21 configured into a system-on-chip (SoC) form, and a set power supply 22.

The signal supply 21 includes a scaler and the like, thus the signal supply 21 converts video data into an appropriate data format to display the video data in the display panel 50, generates an image signal RGB, and outputs the generated image signal RGB to the timing controller 10. In addition, the signal supply 21 can generate a plurality of control signals CS, which include a main clock, a data enable signal, a vertical synchronization signal, a horizontal synchronization signal, and the like and can output the signals to the timing controller 10.

The set power supply 22 can receive an alternating current power, and can convert the alternating current power into a direct current power to output the direct current power. The set power supply 22 can generate and output a set power supply needed in driving the signal supply 21 and the like based on the direct current power, and a control power needed in driving the timing controller 10 etc.

The control part CPCB can include an ASIC, which includes the timing controller 10 and a micro-controller unit (hereinafter, MCU), and the memory part 60.

The timing controller 10 can communicate with the signal supply 21 through an I2C line (I2C) conforming to an I2C interface protocol. The timing controller 10 can process the image signal RGB provided from the signal supply 21, and can output the processed image signal RGB to the data driver 30. For example, the timing controller 10 can convert grayscale data included in the image signal RGB into a format corresponding to a pixel PX structure of the display panel 50, or can process the grayscale data in various ways such as power consumption reduction, image quality compensation, degradation compensation, and external compensation etc.

In addition, the timing controller 10 can generate timing control signals CONT1 and CONT2 to control a driving timing of the gate driver 20 and the data driver 30 based on the control signal CS provided from the signal supply 21, and can provide the timing control signals to the driving parts 20 and 30. For example, the timing controller 10 can generate the timing control signals CONT1 and CONT2 in correspondence with frame frequency information transmitted from the host system 2.

In an embodiment of the present disclosure, the timing controller 10 can receive or transmit EPI data from or to the data driver 30 through one or more pairs of EPI lines (a first interface line) conforming to an EPI Interface (Embedded clock P-P Interface) protocol.

The MCU controls an overall arithmetic operation performed in the ASIC, and controls (read/write control) and manages the memory part 60. For example, the MCU applies various algorithms and/or logics to process data and/or information collected through the timing controller 10, and saves control parameters extracted through the application in the memory part 60. In addition, the MCU performs a necessary arithmetic operation by loading the control parameters saved in the memory part 60, or provides the loaded control parameters to the timing controller 10.

In various embodiments of the present disclosure, the ASIC can further include a module power supply and a programmable auxiliary processor etc., including an arithmetic logic circuit controllable through the MCU.

In various embodiments of the present disclosure, constituent components provided in the ASIC, for example, the timing controller 10 and the MCU can perform communication through a central processing unit (CPU) bus, which has a wide bandwidth and is appropriate for high-speed communication. The CPU bus can be configured in a high-speed serial interface method, and for example, can be configured in a V-by-One (V×1) interface method. Therefore, the timing controller 10 and the MCU receive or transmit V×1 data through one or more V×1 lines (V×1, a second interface line) conforming to a V×1 interface protocol.

The memory part 60 can include at least two heterogeneous memories such as a non-volatile memory and a volatile memory. For example, the memory part 60 can include an embedded multimedia card 61 (hereinafter, eMMC) as a non-volatile memory, and a double data rate RAM 61 (hereinafter, DDR) as a volatile memory. In an embodiment, the non-volatile memory can be configured into an external memory form, but is not limited thereto.

A power of the volatile memory can be turned off when a power of the display device 1 is turned off, and information saved in the volatile memory can be volatilized and thus, can be deleted. The non-volatile memory can operate in a stand-by state (or a stand-by mode) by receiving a certain stand-by power at a time of power-off, and data saved in the non-volatile memory may not be volatilized, but be maintained.

In an embodiment, the display device 1 can be driven in the variable refresh rate mode as described by referring to FIG. 2. In this embodiment, when the frame frequency of the display device 1 is changed, information on the changed frame frequency can be saved in the volatile memory of the memory part 60, for example, the DDR 62. The information on the frame frequency saved in the DDR 62 can be volatilized at a time of power-off of the display device 1.

When the display device 1 is powered on, the host system 2 can drive the display device 1 at a frame frequency which is set before the power-off. For example, the information on the frame frequency which is set before the power-off is not saved in the memory part 60, and the setting of the frame frequency can be asked again between the host system 2 and the timing controller 10.

In order to prevent delay of the power-on process because of the resetting of the frame frequency, the display device 1 according to an embodiment saves information on the frame frequency present before the power-off in the non-volatile memory, for example, in the cMMC 61, and fast sets the frame frequency by loading the saved information during the power-on process.

Further details of the above description according to aspects of the present disclosure will be provided hereinafter.

Figure 4:
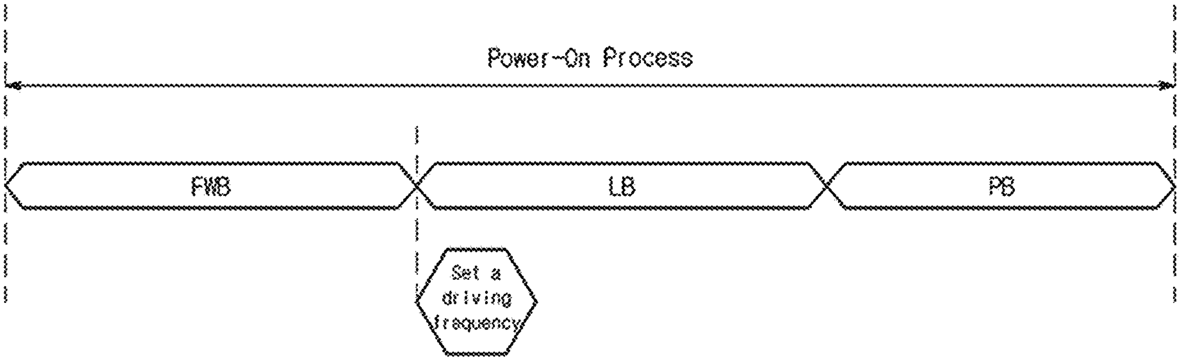
FIG. 4 is a view illustrating a power-on process of a display device according to an embodiment of the present disclosure.

FIG. 4 is a view illustrating a power-on process of the display device according to an embodiment of the present disclosure.

Referring to FIG. 4, when the power-on signal is generated, power is applied to the control part CPCB, and the timing controller 10, the MCU, the memory part 60 etc. on the control part CPCB are activated. Then, firmware booting FWB can start through the activated timing controller 10.

During the firmware booting FWB, the MCU can load a predetermined firmware. The firmware can consist of (or include) extended display identification data (EDID) including a resolution, a frame frequency, and timing information etc. of the display panel 50.

Thereafter, a logic booting LB can be started by the MCU. During the logic booting LB, the MCU can load control parameters, which are saved in advance, with respect to the constituent components in the control part CPCB. In addition, the MCU can perform an initial setting on the constituent components in the control part CPCB (for example, the timing controller 10) according to setting values determined by the control parameters.

In an embodiment, the MCU can load control parameters saved in the non-volatile memory of the memory part 60, for example, the eMMC 61. The control parameters loaded by the MCU can include information on a frame frequency present immediately before the power-off of the display device 1. During the logic booting LB, the timing controller 10 can set a V×1 communication, an EPI communication, and a system clock etc., based on the information on the frame frequency loaded by the MCU.

As described above, the display device 1 according to an embodiment of the present disclosure can perform an initial setting of the constituent components during the logic booting LB, and at the same time, can set a frame frequency of the display device 1 based on the frame frequency present at a time immediately before the power-off. Through this configuration, the frame frequency between the host system 2 and the timing controller 10 can be synchronized.

Thereafter, the timing controller 10 can apply a driving power to the display panel 50, and can perform a panel booting PB to activate the display panel 50. During the panel booting PB, the timing controller 10 can perform an on-sensing process to sense the feature values of the pixels PX disposed on the display panel 50 and/or a bunt sensing process to sense a panel bunt. In addition, the timing controller 10 can further perform a compensation process with respect to the image data DATA to be applied to the data driving part 30 based on the sensing result. When the panel booting PB is completed normally, the display device 1 can start display driving usually.

As described above, the display device 1 according to an embodiment of the present disclosure can perform an initial setting of the constituent components during the logic booting LB, and at the same time, can set the frame frequency of the display device 1 based on the frame frequency present at a time immediately before the power-off. For example, a separate process for setting the frame frequency is not needed between the host system 2 and the timing controller 10 in the power-on process. Therefore, time taken in the power-on process is reduced and the drive of the display panel 50 can be started faster.

Figure 5:
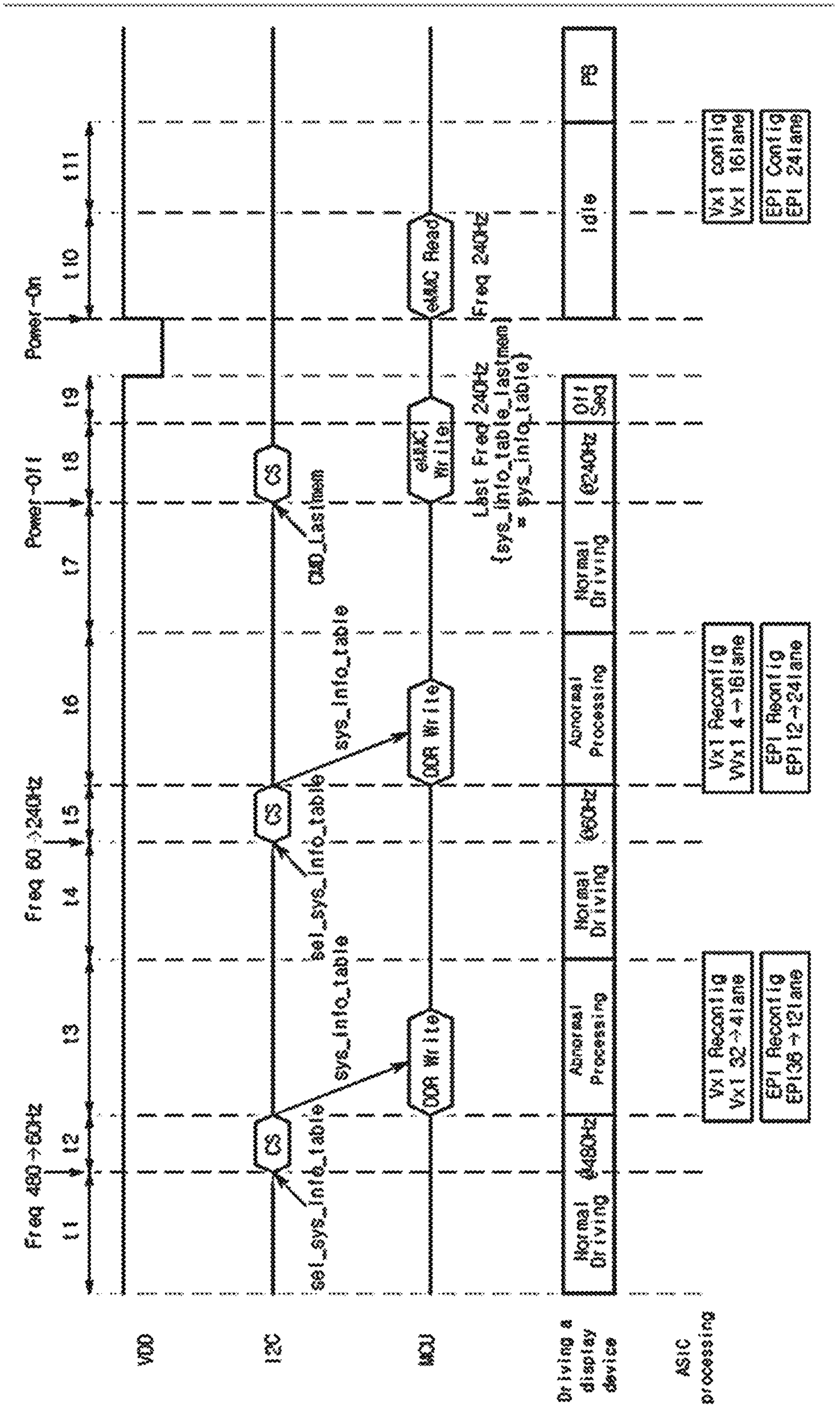
FIG. 5 is a view illustrating signals transmitted or received between a set part and a timing controller when a display device is powered off or powered on according to aspects of the present disclosure.

FIG. 5 is a view illustrating signals transmitted or received between the set part and the timing controller when the display device is powered off or powered on according to aspects of the present disclosure.

Referring to FIG. 5, while the power VDD is supplied from an external device, the display device 1 can drive the display. During the display driving, the host system 2 can vary the frame frequency of the display device 1 based on the complexity of the image signal RGB, a change amount between frames, and the like.

For example, the display device 1 can be driven at 480 Hz in a first period t1. The host system 2 can vary the frame frequency of the display device 1 to 60 Hz in a second period t2.

To this end, the host system 2 can transmit the control signal CS for changing the frame frequency through the I2C line (I2C) in the second period t2. The control signal CS can include, for example, a select system information table (sel_sys_info_table). The select system information table (sel_sys_info_table) can include, for example, select system information parameters such as the changed frame frequency, a quantity of the V×1 lines (V×1) corresponding to the changed frame frequency, a quantity of the pairs of EPI lines corresponding to the changed frame frequency, and a frequency of a system clock corresponding to the changed frame frequency, etc.

The select system information table (sel_sys_info_table) transmitted from the host system 2 can be provided to the MCU. The MCU can save and/or update a system information table (sys_info_table) in the non-volatile memory provided in the control part CPCB, for example, the DDR 62, based on the provided select system information table (sel_sys_info_table). Whenever the frame frequency is changed during the display driving, the select system information table (sel_sys_info_table) including information on the changed frame frequency is provided to the MCU, thereby parameters corresponding to the system information table (sys_info_table) can be saved.

When the frame frequency is changed by the host system 2 during the display driving, the timing controller 10 can reset an internal driving options in correspondence with the changed frame frequency. For example, the timing controller 10 can set a quantity of the V×1 lines (V×1) through which the V×1 data is received from or transmitted to the constituent components in the ASIC (for example, the MCU), in correspondence with the changed frame frequency. In addition, for example, the timing controller 10 can set a quantity of the pairs of EPI lines (EPI) through which the EPI data is received from or transmitted to the data driver 30, in correspondence with the changed frame frequency.

For example, in the low-frequency driving, the timing controller 10 can transmit the V×1 data to the MCU through a less quantity of the V×1 lines (V×1), and can transmit the EPI data to the data driver 30 through a less quantity of the pairs of EPI lines (EPI). In addition, in a high-frequency driving, the timing controller 10 can transmit the V×1 data to the MCU through a greater quantity of the V×1 lines (V×1), and can transmit the EPI data to the data driver 30 through a greater quantity of the pairs of EPI lines (EPI). For example, the timing controller 10 can achieve a data processing speed needed by the high-speed driving by transmitting a greater amount of V×1 data and EPI data through the lines in the high-frequency driving.

In the illustrated embodiment of the present disclosure, when the frame frequency is lowered, the timing controller 10 determines the internal driving as abnormal, reduces the quantity of the V×1 lines (V×1) from 32 to 4 through V×1 reconfiguration during a third period t3, and resets the quantity of the pairs of EPI lines (EPI) from 36 to 12. At this time, the quantity of the V×1 lines (V×1) and the quantity of the pairs of EPI lines (EPI) in correspondence with the frame frequency are examples.

Thereafter, during a fourth period t4, the display device 1 can be driven at 60 Hz which is the reset frame frequency. The host system 2 can vary the frame frequency of the display device 1 to 240 Hz during a fifth period t5.

To this end, the host system 2 can transmit the control signal CS, for example, the select system information table (sel_sys_info_table) for changing the frame frequency, through the I2C line (I2C), during the fifth period t5. The select system information table (sel_sys_info_table) transmitted from the host system 2 is provided to the MCU. The MCU can save and/or update the system information table (sys_info_table) in the DDR 62, based on the provided select system information table (sel_sys_info_table).

In correspondence with a rise of the frame frequency, the timing controller 10 determines the internal driving as abnormal, increases the quantity of the V×1 lines (V×1) from 4 to 16 through the V×1 reconfiguration during a sixth period t6, and resets the quantity of the pairs of EPI lines (EPI) from 12 to 24. At this time, the quantity of the V×1 lines (V×1) and the quantity of the pairs of EPI lines (EPI) in correspondence with the frame frequency are examples.

Thereafter, during a seventh period t7, the display device 1 can be driven at 240 Hz which is the reset frame frequency.

During the display driving, when a power-off signal is input, the host system 2 can transmit a control signal CS, which is for saving information on the current frame frequency in the memory, to the timing controller 10, during an eighth period t8. The control signal CS can include, for example, a last memory command (CMD_Lastmem). The last memory command (CMD_Lastmem) can be a certain register command defined as in Table 1 below.

TABLE 1

| addr | Register Name | Description |
|---|---|---|
| TBD | CMD_Lastmem | Saving a system information table which is reflected immediately previously, in the eMMC |

In Table 1, “addr” indicates an address of a register command, “Register Name” indicates a name of the command, and “Description” indicates an operation performed by the corresponding command.

In response to the last memory command (CMD_Lastmem), the MCU saves information on the current frame frequency, for example, a system information table (sys_info_table) which is last saved, in the eMMC 61 which is the non-volatile memory. The system information table (sys_info_table) can be saved in a page allowing the MCU to easily get access thereto, in the eMMC 61.

Thereafter, during a ninth period t9, in response to a power-off signal, the constituent components of the display device 1 perform a power-off process, and when the power-off process is completed, turn off the power of the display device 1.

After lapse of a certain time, when a power-on signal is generated, the display device 1 can perform a power-on process. At this time, as described referring to FIG. 4, during a tenth period t10, the MCU loads the system information table (sys_info_table) from the eMMC 61 during the logic booting LB of the power-on process.

The timing controller 10 can determine the frame frequency of the display device 1, based on the system information table (sys_info_table) loaded by the MCU. The determined frame frequency is the frame frequency present immediately before the power-off, and can be the frame frequency which is asked by the host system 2 after the power-on.

During an eleventh period t11, the timing controller 10 can set a quantity of the V×1 lines (V×1) and a quantity of the pairs of EPI lines (EPI), etc. as internal driving options so as to drive the display device 1 at the loaded frame frequency. Thereafter, when the panel booting PB is completed, the display device 1 can operate at 240 Hz which is the frame frequency present immediately before the power-off, for example, the frame frequency which is set after the power-on.

As described above, when the display device 1 is driven in the variable refresh rate mode, the display device 1 according to an embodiment of the present disclosure saves the information of the frame frequency, which is set before the power-off, and when the display device 1 is powered on, the display device 1 sets the frame frequency based on the information on the saved frame frequency. Accordingly, the display device 1 allows fast start of the driving of the display device by reducing the time taken in setting an additional frame frequency at the time of power-on.

Figure 6:
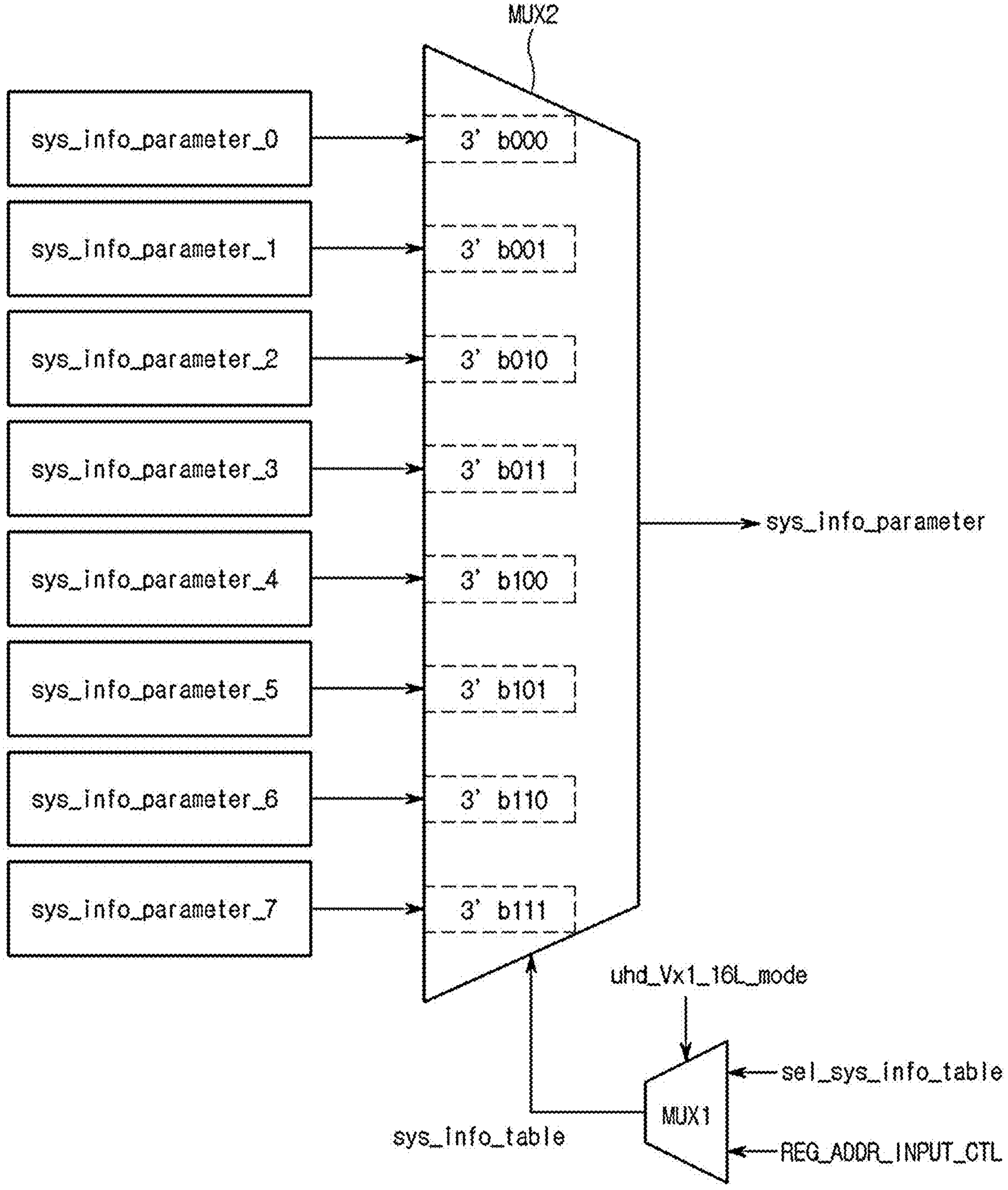
FIG. 6 is a view illustrating a structure of a multiplexer of a system information parameter according to an embodiment of the present disclosure.

FIG. 6 is a view illustrating a structure of a multiplexer of a system information parameter according to an embodiment of the present disclosure.

Referring to FIG. 6, the system information parameter can be generated in the form of a table through a logic circuit 3 including a multiplexer. Such logic circuit 3 can be formed in the MCU or in the programmable auxiliary processor.

The logic circuit 3 can include a first multiplexer MUX1 configured to receive the select system information table (sel_sys_info_table) from the host system 2, and a certain input control value (REG_ADDR_INPUT_CTL) input from the registry, and output the system information table (sys_info_table) through logical operations of the select system information table (sel_sys_info_table) and the input control value (REG_ADDR_INPUT_CTL). The first multiplexer MUX1 can operate by receiving a certain mode value (uhd_V×1_16L_mode) input through the V×1 line (V×1).

In addition, the logic circuit 3 can include a second multiplexer MUX2 configured to receive a plurality of system info parameter bits (sys_info_parameter_0 to sys_info_parameter_7), and output the system information parameter (sys_info_parameter) through logical operations of the plurality of system info parameter bits (sys_info_parameter_0 to sys_info_parameter_7). The second multiplexer MUX2 can process the system info parameter bits (sys_info_parameter_0 to sys_info_parameter_7) which are input, based on the system information table (sys_info_table) which is output from the first multiplexer MUX1 such that the system info parameter bits (sys_info_parameter_0 to sys_info_parameter_7) correspond to the system information table (sys_info_table), and can output the processed system info parameter bits (sys_info_parameter_0 to sys_info_parameter_7).

The system info parameter bits (sys_info_parameter_0 to sys_info_parameter_7) input into the second multiplexer MUX2 can be defined by a parameter region of the firmware. In an embodiment of the present disclosure, the system information parameter (sys_info_parameter) can be defined as Table 2 below.

TABLE 2

| | |
|---|---|
| sys_info_parameter_0 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |
| sys_info_parameter_1 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |
| sys_info_parameter_2 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |
| sys_info_parameter_3 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |

TABLE 2-continued

| | |
|---|---|
| sys_info_parameter_4 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |
| sys_info_parameter_5 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |
| sys_info_parameter_6 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |
| sys_info_parameter_7 | [7:0] SYS_INFO_PARA0_BYTE1 |
| | [7:0] SYS_INFO_PARA0_BYTE2 |
| | [7:0] SYS_INFO_PARA0_BYTE3 |
| | [7:0] SYS_INFO_PARA0_BYTE4 |

For example, bits of each system information parameters (sys_info_parameter) can be defined to indicate information as in Table 3 below.

TABLE 3

| BITS | BYTE1[7:0] | BYTE2[15:8] | BYTE3[23:16] | BYTE4[31:24] |
|---|---|---|---|---|
| 7 | frame_rate[2] | vx1_lane[2] | m_ddr_info[2] | valid[7] |
| 6 | frame_rate[1] | vx1_lane[1] | m_ddr_info[1] | valid[6] |
| 5 | frame_rate[0] | vx1_lane[0] | m_ddr_info[0] | valid[5] |
| 4 | adc_clk_info | valid_vx1_lane[2] | real_orbit_pnl | valid[4] |
| 3 | sys_clk_info | valid_vx1_lane[1] | epi_pair_sel[1] | valid[3] |
| 2 | pnl_resol_info[2] | valid_vx1_lane[0] | epi_pair_sel[0] | valid[2] |
| 1 | pnl_resol_info[1] | num_ddr_used | reserved | valid[1] |
| 0 | pnl_resol_info[o] | spo_enable_out | reserved | valid[0] |

As seen in Table 3, first bytes (each byte consists of (or includes) eight sets of each bit) of each of seventh to fifth bits of the system information parameter (sys_info_parameter) indicate the frame frequency, second bytes of each of the seventh to fifth bits of the system information parameter (sys_info_parameter) indicate the quantity of the V×1 lines, and third bytes of each of third to second bits of the system information parameter (sys_info_parameter) indicate the quantity of the pairs of EPI lines.

The system information parameters (sys_info_parameter) which are defined as above can be converted into a table format to indicate values which correspond to the select system information table (sel_sys_info_table) received from the host system 2, and can be saved in the memory part 60.

From the foregoing description of the embodiments of the present disclosure with reference to accompanying drawings, those skilled in the art to which this disclosure pertains can understand that the present disclosure can be embodied in other specific forms without changing the technical spirit or essential characteristics of the disclosure. In this connection, the above-described embodiments should be understood as examples and as not limiting in all aspects. The scope of the embodiments is represented by the appended claims, rather than the foregoing detailed description. In addition, all changes or modified forms derived from the meaning and range of the appended claims and the equivalents thereof are included in the scope of the embodiments of the present disclosure.

REFERENCE NUMERALS

1: display device
10: timing controller
20: gate driver
30: data driver
40: power supply
50: display panel

What is claimed is:

1. A display device, comprising:

a host system configured to output an image signal and a control signal comprising information on a frame frequency;

a timing controller configured to generate image data based on the image signal and generate a timing control signal in correspondence with the information on a frame frequency based on the control signal, and output the image data and the timing control signal;

a memory part comprising a non-volatile memory and a volatile memory; and a micro-controller unit configured to control the memory part, wherein the micro-controller unit is configured to save information on a frame frequency of a current frame frequency in the non-volatile memory when a power-off signal is generated, wherein the timing controller is configured to set a frame frequency based on the information on the frame frequency saved in the non-volatile memory when a power-on signal is generated, and wherein when the frame frequency is varied by the host system during display driving, the micro-controller unit saves information on the varied frame frequency in the volatile memory.

2. The display device of claim 1, wherein when the power-off signal is generated, the micro-controller unit saves, in the non-volatile memory, the information on the frame frequency last saved in the volatile memory.

3. The display device of claim 2, wherein when the power-on signal is generated, the micro-controller unit and the timing controller perform a power-on process comprising firmware booting that loads predetermined firmware, logic booting that loads a saved control parameter, and panel booting that applies a driving power to a display panel, and wherein during the logic booting, the micro-controller unit and the timing controller load the information on the varied frame frequency saved in the volatile memory, and set the frame frequency based on the loaded information on the frame frequency.

4. The display device of claim 2, wherein the timing controller is connected to the micro-controller unit through a second interface line, and varies a quantity of the second interface line through which data is transmitted to the micro-controller unit based on the information on the frame frequency.

5. The display device of claim 1, further comprising:

a display panel including pixels disposed therein; and a data driver connected to the timing controller through a first interface line, and configured to provide a data voltage in correspondence with the image data to the pixels based on the timing control signal.

6. A display device, comprising:

a host system configured to output an image signal and a control signal comprising information on a frame frequency;

a timing controller configured to generate image data based on the image signal and generate a timing control signal in correspondence with the information on a frame frequency based on the control signal, and output the image data and the timing control signal;

a memory part comprising a non-volatile memory and a volatile memory;

a micro-controller unit configured to control the memory part;

a display panel including pixels disposed therein; and a data driver connected to the timing controller through a first interface line, and configured to provide a data voltage in correspondence with the image data to the pixels based on the timing control signal, wherein the micro-controller unit is configured to save information on a frame frequency of a current frame frequency in the non-volatile memory when a power-off signal is generated, wherein the timing controller is configured to set a frame frequency based on the information on the frame frequency saved in the non-volatile memory when a power-on signal is generated, and wherein the timing controller varies a quantity of the first interface line through which data is transmitted to the data driver based on the information on the frame frequency.

7. The display device of claim 6, wherein the timing controller increases the quantity of the first interface line when the frame frequency increases, and decreases the quantity of the first interface line when the frame frequency decreases.

8. A method for driving a display device comprising: a timing controller configured to generate image data and a timing control signal in correspondence with information on a frame frequency and output the image data and the timing control signal; a memory part comprising a non-volatile memory and a volatile memory; and a micro-controller unit configured to control the memory part, the method comprising:

saving information on a frame frequency of a current frame frequency in the non-volatile memory when a power-off signal is generated;

allowing the timing controller to perform a power-off process to turn off power in response to the power-off signal;

allowing the micro-controller unit and the timing controller to perform a power-on process when a power-on signal is generated; and when the frame frequency is varied by a host system during display driving before the power-off signal is generated, allowing the micro-controller unit to save information on the varied frame frequency in the volatile memory, wherein the performing of the power-on process comprises:

loading the information on the frame frequency saved in the non-volatile memory; and allowing the timing controller to set a frame frequency based on the loaded information on the frame frequency.

9. The method for driving the display device of claim 8, wherein the timing controller is connected to the micro-controller unit through a second interface line, and wherein the setting the frame frequency comprises:

varying a quantity of the second interface line through which data is transmitted to the micro-controller unit based on the information on the frame frequency.

10. The method for driving the display device of claim 8, wherein the saving the information on the frame frequency in the non-volatile memory comprises:

saving, in the non-volatile memory, the information on the frame frequency last saved in the volatile memory during display driving, when the power-off signal is generated.

11. The method for driving the display device of claim 10, wherein the performing the power-off process comprises:

firmware booting that loads a predetermined firmware;

logic booting that loads a saved control parameter; and panel booting that applies a driving power to a display panel, wherein during the logic booting, the loading the information on the frame frequency and the setting a frame frequency are simultaneously performed.

12. A method for driving a display device comprising: a timing controller configured to generate image data and a timing control signal in correspondence with information on a frame frequency and output the image data and the timing control signal; a memory part comprising a non-volatile memory and a volatile memory; and a micro-controller unit configured to control the memory part, the method comprising:

saving information on a frame frequency of a current frame frequency in the non-volatile memory when a power-off signal is generated;

allowing the timing controller to perform a power-off process to turn off power in response to the power-off signal; and allowing the micro-controller unit and the timing controller to perform a power-on process when a power-on signal is generated, wherein the performing of the power-on process comprises:

loading the information on the frame frequency saved in the non-volatile memory; and allowing the timing controller to set a frame frequency based on the loaded information on the frame frequency, wherein the display device further comprises:

a display panel including pixels disposed therein; and a data driver connected to the timing controller through a first interface line and configured to provide a data voltage in correspondence with the image data to the pixels based on the timing control signal, and wherein the setting the frame frequency comprises:

varying a quantity of the first interface line through which data is transmitted to the data driver based on the information on the frame frequency.

* * * * *